Aug. 31, 1948. H. E. COOTES ET AL 2,448,418
CHEMICAL GUN TRAP
Filed Oct. 12, 1944
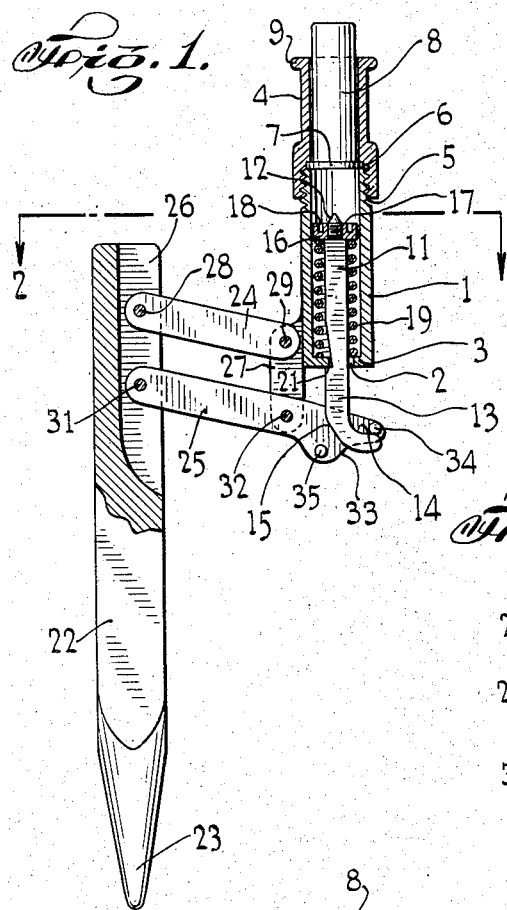
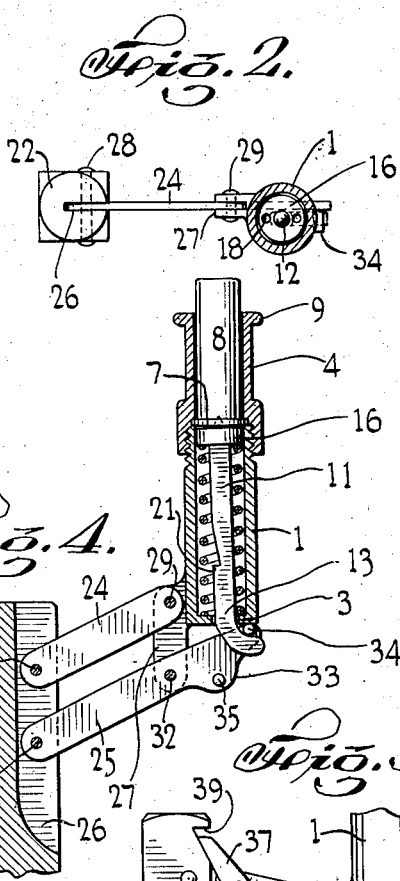
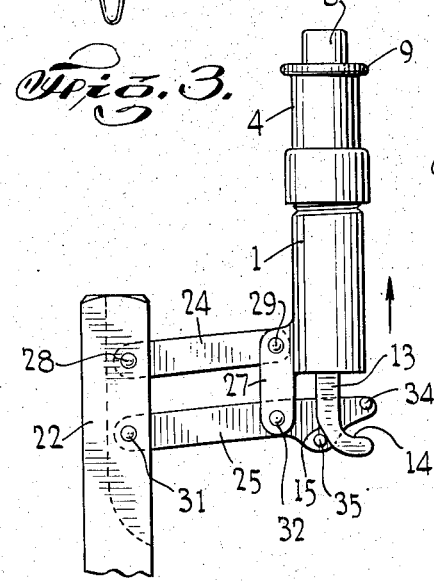
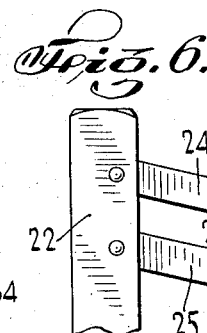
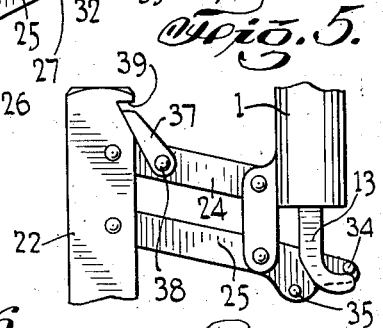
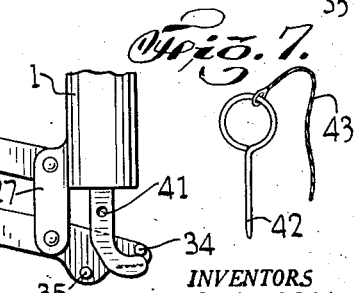
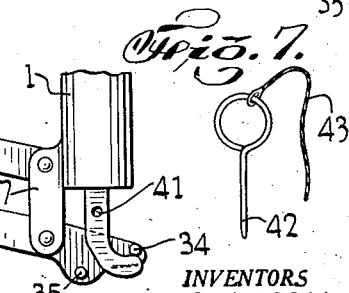
INVENTORS
HAROLD E. COOTES
HERSHEY R. GRAYBILL
BY
Robert E. Burns
ATTORNEY Patented Aug. 31, 1948

2,448,418

UNITED STATES PATENT OFFICE 2,448,418

CHEMICAL GUN TRAP

Harold Edwin Cootes, Detroit, Mich., and Hershey Roy Graybill, Manheim, Pa., assignors to Animal Trap Company of America, Lititz, Pa., a corporation of Pennsylvania Application October 12, 1944, Serial No. 558,436

19 Claims. (Cl. 43—84)

The present invention relates to traps for destroying certain predatory animals, for example, coyotes and wolves by explosively discharging poison or other chemicals into the mouth of an animal springing the trap. The poison and a propellant charge of explosive are preferably contained in a cartridge somewhat similar to a gun cartridge. The cartridge is fired by a trap provided with means for holding the cartridge and for holding suitable bait, a firing pin for discharging the cartridge, and trigger mechanism for releasing the firing pin to discharge the cartridge when the bait is seized by an animal for which the trap is set.

As the traps are operated out of doors, where they are subject to the deleterious effects of dirt, rain, snow, ice, etc., it is essential for them to be capable of operating satisfactorily under extremely adverse conditions. Moreover the traps must be sufficiently sensitive to be discharged quickly and surely when the bait is seized by an animal for which the trap is set, and must yet be entirely safe so that the trap will not be discharged accidentally while being set or by being stepped on or struck by cattle, sheep, horses or other animals. In order for the trap to be satisfactory from a practical and commercial point of view, they must be sufficiently simple and fool proof that they can be used and serviced by persons not having any great amount of mechanical skill, and must be sufficiently inexpensive that a trapper can afford to own and operate a long line of traps.

It is an object of the present invention to provide a gun trap of simple construction that can be quickly and easily set, and is safe and reliable in use. A safety feature of our invention is that the gun trap can be placed in position, loaded and baited before it is cocked, thereby eliminating the hazard created by cocking a gun trap before the cartridge is inserted and the bait is attached. A further safety feature of our invention is that it is possible to determine whether the gun trap is loaded or is discharged merely by looking at it without removing the trap from the ground or dismantling it. In a preferred embodiment of our invention, the safety of the trap is further increased by a safety latch or pin for positively preventing accidental discharge of the cartridge while the trap is being set, baited, positioned or moved. Moreover, the safety device gives a visual indication as to whether the trap is disarmed or armed.

A further feature of our invention is the low cost of manufacture of the trap gun due to the absence of close tolerances or the need of accurate fitting parts. The trap can hence be made by mass production methods with a minimum amount of machining or finishing operations. Moreover, because of its loose construction and the absence of closely fitting or sliding parts, the trap gun in accordance with our invention, operates smoothly and easily, so that very little physical effort is required to spring the trap. The trap is hence particularly effective in trapping coyotes, wolves and other animals that are instinctively wary and difficult to catch. The absence of closely fitting parts and close tolerances also renders the gun trap more reliable in its operation under adverse conditions, as it is not easily clogged by dirt or ice. The danger of the trap becoming clogged is still further reduced by the fact that the operating mechanism is completely above the ground and is so constructed that rain or other water will drain off before it has a chance to freeze and the operating mechanism is protected from and unaffected by particles of dirt.

A further important feature of our invention is that the gun trap can be easily and quickly set without the use of any setting tools. This feature thus obviates the need of a trapper carrying special setting tools in order to set the trap. Moreover the ease with which the gun trap in accordance with the present invention can be set is of particular importance when working outdoors in extremely cold weather impossible for the trapper to set the trap without having to remove his gloves.

Still other objects and advantages of our invention will be apparent from the following description and the appended claims, in conjunction with the accompanying drawings which show by way of example an embodiment selected for the purpose of illustration.

In the drawings,

Fig. 1 is a side elevation of a trap embodying our invention, parts of the trap being shown in vertical section. In this figure the trap is shown in set or cocked position.

Fig. 2 is a transverse section of the trap shown in Fig. 1, taken approximately on the line 2—2 in Fig. 1.

Fig. 3 is a side elevation of the upper portion of the trap shown in Fig. 1 showing the trap just prior to release of the firing pin to discharge the cartridge.

Fig. 4 is a partial side elevation and vertical section, similar to the upper portion of Fig. 1, but showing the trap in sprung position.

Fig. 5 is a partial side elevation showing a safety latch in accordance with a preferred form of our invention.

Fig. 6 is a partial side elevation similar to Fig. 5, but showing another form of safety device.

Fig. 7 shows a safety pin to be used in conjunction with the trap shown in Fig. 6.

In Figs. 1 to 4 of the drawings, there is shown by way of example one embodiment of our invention. The trap shown in the drawings has a hollow cylindrical casing or body portion 1, which is open at its upper end and also has a restricted opening 2 in the lower end or bottom 3. The bottom 3 is shown as being integral with the side walls of the body portion or socket 1, and the opening 2 is preferably non-circular, being illustrated as rectangular in shape.

At its upper end the body portion 1 is provided with means for holding a chemical or other explosive cartridge and for holding bait. The cartridge holder is so constructed that a cartridge can readily be inserted and the casing of a discharged cartridge removed from the holder. In the embodiment illustrated in the drawings, a cylindrical cartridge holder or chamber 4 is removably attached to the body portion 1 by being screwed onto the upper end 5 of the body portion, the cartridge chamber and body portion being provided with complementary threads. An internal shoulder 6 of the cartridge holder is adapted to engage the rim 7 of a cartridge 8 to hold the latter firmly in the chamber. The cartridge case of a discharged cartridge is removed from the chamber by unscrewing the holder 4 from the body portion 1. A new cartridge can thereupon be inserted in the cartridge holder and the latter screwed back onto the body portion of the trap. The cartridge chamber 4 also serves as a bait holder, and for this purpose is provided at its upper end with an external flange 9 for retaining the bait.

The body portion 1 is also provided with mechanism, herein referred to generically as a firing pin, adapted to fire or discharge a chemical or other explosive cartridge held in the cartridge holder 4. In the drawings, a firing pin 11 is shown in the form of an elongated bar or rod which is pointed at its upper end, as indicated at 12. The lower end of the firing pin extends down through the opening 2 in the body portion 1, the downwardly projecting portion 13 being referred to as the tail portion of the firing pin. This downwardly projecting tail portion 13 is shown as being curved to provide a laterally projecting arm having an upper cam face 14 and a lower cam portion 15. At least the lower portion of the firing pin 11 is preferably of rectangular or other non-circular cross section, so that engagement with the non-circular opening 2 in the bottom of the body portion 1 prevents turning of the firing pin. The opening 2 also guides the lower end of the firing pin and keeps it approximately centered in the body portion 1. However the opening 2 is sufficiently large to permit limited lateral movement of the firing pin.

The upper end of the firing pin 11 is provided with an enlarged head portion 16 shown in the form of a circular disc secured to the firing pin just below the pointed end 12. For convenience of assembly and disassembly of the trap, the disc 16 may be screwed onto a short threaded section 17 of the firing pin, the disc being provided with wrench holes 18 for this purpose. It will be seen that the head or disc 16 at the upper end of the firing pin 11 cooperates with the opening 2 of the bottom portion 1 engaging the lower portion of the firing pin to keep the firing pin approximately centered in the body portion, while permitting its reciprocal movement relative to the body. The head portion 16 also provides an engagement for a compression spring 19 for actuating the firing pin. The spring 19 is enclosed in the body portion 1 and surrounds the firing pin 11, one end of the spring bearing on the bottom 3 of the body portion, and the other end pressing upwardly on the disc 16 secured to the upper end of the firing pin. It will be seen that the firing pin 11 may be moved downwardly against the action of the spring to set or cocked position, and upon release will be driven rapidly upwardly by the spring 19 to strike and discharge the cartridge 8 held in the cartridge holder 4.

Means is provided for releasably holding the firing pin in cocked position and for releasing the firing pin to fire a cartridge held in the cartridge chamber of the trap. A feature of the present invention is the simplicity of the means for cocking and releasing the firing pin. In accordance with this feature of our invention the firing pin 11 is provided with an abutment detent or shoulder 21 adapted in the cocked or set position of the trap to engage a fixed part of or carried by the body portion 1. The firing pin is released to spring the trap by moving it laterally to disengage the shoulder or detent of the firing pin from the fixed part of the body portion. In the embodiment of the invention illustrated in the drawing, the shoulder 21 is provided by notching the firing pin 11 as shown, the position of the notch being such that the shoulder 21 is adapted to engage an edge of the hole or opening 2 in the bottom of the body portion 1 when the firing pin is in cocked position. In order to cock the firing pin it is first moved downwardly against the action of the spring 19 and then moved laterally, the movement being toward the left as illustrated in Fig. 1, to cause the shoulder 21 of the firing pin to engage the edge of the opening 2. The firing pin is released to spring the trap and discharge the cartridge by moving the lower end of the firing pin slightly to the right, as viewed in Fig. 1, so that the shoulder 21 is disengaged from the edge of the opening 2. The firing pin is thereupon moved rapidly upwardly by the spring 19, causing the pointed upper end 12 of the firing pin to strike the percussion cap or other detonating device, whereby the cartridge 8 is discharged. It will be noted that in addition to guiding the upper end of the firing pin and forming an engagement for the spring 19, the disc or head 16 of the firing pin also provides a support for the base or bottom of the cartridge at the time the latter is fired.

The body portion 1 is connected with a base or anchor portion which forms a unitary part of the trap, the connection being such that the body portion is movable up and down while being held against tipping, so as to be maintained in an upright position. The anchor portion is shown in the form of a stake 22, which is pointed at its lower end 23 so that it may readily be pushed or driven into the ground. The stake is preferably square or of other non-circular cross section to hold it against turning, although this is not essential to the operation of the trap. In the example shown in the drawings the body portion 1 is connected with the stake or anchor 22 by parallel motion mechanism, which permits the relative movement of the stake and body portion while keeping the latter in upright position.

The parallel motion mechanism shown comprises parallel links 24 and 25, which are vertically spaced from one another and are pivotally connected with the anchor stake 22 and the body portion 1. For convenience of attaching the links 24 and 25 to the stake and to afford lateral support the stake is preferably slotted, as indicated at 26, to receive the ends of the links. The body portion 1 is provided with a laterally and downwardly extending bracket portion 27 which is fixed to or formed integrally with the body portion or socket 1. The bracket 27 is preferably slotted or bifurcated as shown in Fig. 2, so that the links 24 and 25 are received between opposed portions of the brackets. The upper link 24 is attached to the stake by a pivot pin 28 and is attached to the bracket 27 of the body portion 1 by a pivot pin 29. The lower link 25 is connected with the stake 22 by a pivot pin 31 and to the bracket 27 by a pivot pin 32. It will be seen that the parallel motion linkage described permits up and down movement of the body portion 1, relative to the stake 22 while maintaining the body portion upright. By reason of the body portion 1 being laterally offset from the stake as shown, the stake can be driven into the ground by striking the top of the stake with a hammer or other object without in any way damaging the body portion or associated mechanism.

A feature of the present invention is that the firing pin or other cartridge firing mechanism is released to discharge the cartridge by the upward movement of the body portion 1 and associated cartridge and bait holder 4, the release being effected by mechanism actuated by the linkage connecting the body portion with the anchor stake. A further feature of the invention is that downward movement of the firing pin to cocked position to set the trap is effected by mechanism actuated by the connecting linkage upon downward movement of the body portion relative to the anchor. The term "linkage" is used in the specification and claims in a generic sense to denote any means by which the anchor stake and body portion are connected.

In the embodiment shown in the drawings, the lower link 25 is extended beyond the pivot 32 to provide an arm or extension 33 adapted to act on the downwardly extending portion 13 of the firing pin. The bracket portion 27 to which the link 25 is pivotally connected is preferably offset relative to the central longitudinal axis of the body portion 1, as illustrated in Fig. 2, so that the extension 33 lies alongside of the downwardly projecting tail portion of the firing pin. The arm or extension 33 of the link 25 is provided with a pin or abutment 34 adapted to engage the upper cam surface 14 of the curved lower end of the firing pin, and with an abutment 35 adapted to engage the lower or outer cam face 15. When the body portion 1 of the trap is moved downwardly from the position shown in Fig. 4 to the position shown in Fig. 1, the abutment 34 on the arm 33 of link 25 engages the firing pin to draw it downwardly against the action of the spring 19 and thereupon moves it laterally to engage the shoulder 21 of the firing pin with the edge of the opening 2. The firing pin is thus cocked by downward movement of the body portion 1 relative to the anchor stake 22. Upon upward movement of the body portion 1 from the set or cocked position shown in Fig. 1 to the position shown in Fig. 3, the abutment 35 on the arm 33 is brought into engagement with the tail portion of the firing pin to move it laterally to disengage the shoulder 21 of the firing pin from the edge of the hole 2. The firing pin is thereupon forced upwardly by the spring 19 to fire the cartridge. It will be noted that in the example shown in the drawings, the body portion 1 moves freely from the position shown in Fig. 1, to the position shown in Fig. 3 before the trap is discharged. Moreover, the connecting linkage between the body portion 1 and the anchor stake 22 is preferably sufficiently loose that the body portion has a slight amount of movement in a lateral direction. This lost motion and freedom of movement prevents the trap being accidentally or prematurely discharged and avoids exciting the suspicions of an animal touching the bait gingerly with its muzzle or paw. The bait does not have the feel of being fastened down. Moreover, because of the free action of the trap, the bait comes up easily when it is seized by the animal. This upward movement trips the firing pin in the manner described above, and the poison or other contents of the cartridge is discharged into the animal's mouth. The normal operation of preparing and setting the trap shown in the drawings is as follows.

The anchor stake 22 is driven into the ground, preferably leaving the upper portion of the stake projecting. A cartridge is loaded into the cartridge chamber 4 of the trap and suitable bait or lure is attached to the outside of the cartridge chamber. The firing pin is then cocked by downward movement of the socket or body portion 1, relative to the anchor stake 22. As the cocking of the firing pin is thus the last step in the setting of the trap, there is no danger of the trap being accidentally discharged while being loaded, baited or positioned, and the trap is therefore exceptionally safe to use.

In the embodiments of the invention shown in Figs. 5 and 6 additional safety devices are provided. As illustrated in these figures, accidental discharge of the trap may be avoided either by preventing upward movement of the body portion 1 relative to the anchor stake 22, or by preventing the firing pin from striking the cartridge. Upward movement of the body portion 1 can for example be checked by suitable latch means acting on the linkage connecting the body portion with the anchor stake. As shown by way of example in Fig. 5, a latch member 37 is pivotally connected to the upper link 24 at 38 and is adapted when in operative position to engage a notch 39 formed in the anchor stake 22. It will be seen that when the latch is in the position shown, its engagement with the notch 39 will prevent sufficient upward movement of the body portion 1 to release the firing pin. When the latch 37 is swung in a clockwise direction past its pivot 38, upward movement of the body portion 1 is permitted. It will be apparent that other latch devices may be used to hold the body portion 1 against upward movement sufficient to spring the trap.

The release of the firing pin to discharge the cartridge may also be prevented by holding the firing pin against the lateral movement necessary to disengage the shoulder 21 of the firing pin from the edge of the opening 2, or by holding the firing pin against vertical upward movement. In Fig. 6 of the drawing, the firing pin is shown provided with a hole 41 adapted to receive a pin 42 such as that shown in Fig. 7, or a wire nail or other instrumentality. With the pin 42 inserted in the hole 41 of the firing pin it will be seen that even if the shoulder 21 is released from the edge of the opening 2 the firing pin cannot be moved upwardly far enough to strike the cartridge. With the safety pin 42 withdrawn, free action of the trap is permitted. If desired, the pin 42 may be provided with a cord or string 43 by means of which the pin may be withdrawn by a person at some distance from the trap. If the trap has been accidentally sprung before the safety pin 42 is withdrawn, the safety pin will be held tightly between the firing pin and the bottom of the body portion 1 by reason of the upward force of spring 19 exerted on the firing pin, thereby holding the safety pin 42 against withdrawal and warning the operator that the trap is not properly set.

The operation of setting the trap illustrated in Figs. 5 and 6 will be the same as that described in connection with Figs. 1 to 4. Alternatively, the firing pin can be cocked and the safety latch or device applied before the trap is loaded and baited. The safety latch is then released as the last step of the setting operation.

It will be seen from the above description that because of the simplicity of this construction, the trap in accordance with our invention is inexpensive to manufacture. The body portion 1 and cartridge holder 4 can readily be made from suitable tube stock, while the firing pin 11 can be made from bar stock or stamped from sheet material. The connecting links 24 and 25 may likewise be stamped from sheet material, or cut from strips, while the anchor stake 22 may be formed from bar or channel stock. As the operating mechanism requires no closely fitting parts and involves no close tolerances, the machine operations necessary to produce the trap are reduced to a minimum. The trap construction is hence particularly adapted to mass production methods.

Moreover the trap in accordance with our invention is particularly safe and convenient to operate. As the firing pin is cocked merely by downward movement of the body portion 1, no special setting tool is required for this operation. This method of setting the trap also makes it possible to load and bait the trap before the firing pin is cocked, thereby contributing to the safety of the setting operation. A further safety feature of the trap is that it can immediately be determined by visual inspection whether the trap is in set position or has been sprung without removing the trap from the ground or in any way dismantling it. It is likewise immediately apparent from merely looking at the trap whether the safety device such as that shown in Fig. 5 or Fig. 6 is in "safe" or in released positions.

For convenience in describing our invention, reference has been made to the particular embodiment shown by way of example in the drawings. It will, however, be understood that our invention is not limited to the details of construction of this embodiment. It will moreover be understood that although the position and direction of motion of various parts have been described with reference to the trap in vertical position as shown, the trap can of course operate in other positions.

What we claim and desire to secure by Letters Patent is:

1. A chemical gun trap comprising an anchor stake, a body portion having means for holding a cartridge, parallel motion linkage connecting said body portion with said stake to permit up and down movement of said body portion while maintaining it in an upright position, a firing pin carried by said body portion, a spring for actuating said firing pin, means for releasably holding said firing pin in cocked position against the action of said spring, and means actuated by said linkage upon upward movement of said body portion to release said firing pin to fire said cartridge.

2. A chemical gun trap comprising an anchor, a body portion having means for holding a cartridge, linkage connecting said body portion with said anchor to permit up and down movement of said body portion while maintaining it in an upright position, a firing pin carried by said body portion, a spring for actuating said firing pin, means actuated by downward movement of said body portion relative to said anchor to move said firing pin against the action of said spring to cocked position, means for releasably holding said firing pin in cocked position, and means actuated by upward movement of said body portion relative to said anchor to release said firing pin to fire said cartridge.

3. A chemical gun trap comprising an anchor, a body portion connected with said anchor and movable relative thereto, a cartridge holder carried by said movable body portion, a firing pin reciprocable in said body portion and adapted to strike a cartridge held by said holder, a spring for actuating said firing pin, means actuated by movement of said body portion in one direction to move said firing pin against the bias of said spring to cocked position, means for releasably holding said firing pin in cocked position, and means actuated by movement of said body portion in the opposite direction to release said firing pin.

4. A gun trap comprising an anchor, a body portion connected with said anchor for movement relative thereto, a cartridge holder carried by said body portion, a firing pin reciprocable in said body portion and having a detent adapted to engage a fixed part of said body portion for releasably holding the firing pin in cocked position, a spring for actuating said firing pin, and means actuated by movement of said body portion relative to said anchor for moving said firing pin laterally to disengage said detent from said fixed part to release the firing pin.

5. A gun trap comprising an anchor, a hollow body portion having a restricted opening in its bottom, means connecting said body portion and anchor to permit up and down movement of the body portion while maintaining it in upright position, a cartridge holder at the upper end of said body portion, a firing pin reciprocable in said body and having a tail portion projecting downwardly through said hole, a spring for actuating said firing pin to fire a cartridge in said cartridge holder, a detent for releasably holding said firing pin in cocked position against the action of said spring, and means engaging the tail portion of said firing pin to release the firing pin upon movement of said body portion relative to said anchor.

6. A gun trap comprising a hollow body portion, a cartridge holder carried by said body portion, a firing pin reciprocable in said body portion, a spring acting between the firing pin and said body portion to actuate the firing pin, said firing pin having a detent adapted to engage a fixed abutment of said body portion to hold the firing pin in cocked position against the action of said spring, and means for moving said firing pin laterally to disengage said detent from said abutment and thereby release the firing pin.

7. A gun trap comprising a hollow body portion having at one end a restricted opening, a cartridge holder at the opposite end of said body portion, a firing pin reciprocable in said body and having a tail portion extending through said opening, a spring acting between the firing pin and the body portion to move said firing pin toward said cartridge holder, said firing pin having a shoulder adapted to engage an edge of said opening to hold the firing pin in cocked position against the action of said spring, and means for moving said firing pin laterally to disengage said shoulder from said edge and thereby release the firing pin to fire a cartridge in said cartridge holder.

8. A gun trap comprising a hollow body portion having at one end a restricted opening, a cartridge holder at the opposite end of said body portion, a firing pin reciprocable in said body and having a tail portion extending through said opening, a spring acting between the firing pin and the body portion to move said firing pin toward said cartridge holder, said firing pin having a shoulder adapted to engage an edge of said opening to hold the firing pin in cocked position against the action of said spring, and means acting on the projecting tail portion of the firing pin to disengage said shoulder from said edge and thereby release the firing pin to fire a cartridge in said cartridge chamber.

9. A gun trap comprising a hollow cylindrical body portion, a closure at the lower end of said body portion having a restricted opening, a cartridge holder at the upper end of said body portion, a firing pin reciprocable in said body portion and having a tail portion extending down through said opening, a guide at the upper end of said firing pin cooperating with said opening to guide the reciprocable movement of the firing pin, a compression spring around said firing pin and acting between said guide and said closure to move the firing pin toward said cartridge holder, an abutment on said firing pin adapted to engage an edge of said opening to hold the firing pin in cocked position against the action of said spring, and means for disengaging said abutment from said edge to release the firing pin.

10. A gun trap comprising an anchor, a body portion having means for holding a cartridge, linkage connecting said body portion to said anchor to permit up and down movement of said body portion while maintaining it in an upright position, a firing pin carried by said body portion, a spring for actuating said firing pin, means for releasably holding said firing pin in cocked position, and means actuated by said linkage for releasing the firing pin upon upward movement of said body portion, relative to said anchor, said body portion being freely movable a substantial distance upwardly from a set position without releasing the firing pin and being movable upwardly an additional amount to release said firing pin to fire a cartridge held by said cartridge holder.

11. A gun trap comprising an anchor, a body portion having means for holding a cartridge, linkage connecting said body portion to said anchor to permit up and down movement of the body portion while maintaining it in an upright position, a firing pin carried by said body portion, a spring for actuating said firing pin, means actuated by downward movement of said body portion relative to said anchor to move the firing pin against the action of said spring to cocked position, means for releasably holding the firing pin in cocked position, and means actuated by upward movement of said body portion relative to said anchor to release the firing pin, said body portion being freely movable a substantial distance upwardly from the position in which the firing pin is cocked to the position in which the firing pin is released.

12. A gun trap comprising an anchor, a hollow body portion having an opening at its lower end, a cartridge holder at the upper end of said body portion, a firing pin reciprocable in said body portion and having a tail portion extending out through said opening, a spring for actuating the firing pin, said firing pin having a shoulder adapted to engage an edge of said opening to hold the firing pin in cocked position against the action of said spring, and linkage connecting the body portion with said anchor to permit up and down movement of the body while keeping it in an upright position, including a link having an abutment adapted to engage the tail portion of the firing pin to disengage said shoulder from said edge and thereby release the firing pin to fire a cartridge held by said cartridge holder.

13. A gun trap comprising an anchor, a hollow body portion having an opening at its lower end, a cartridge holder at the upper end of said body portion, a firing pin reciprocable in said body portion and having a tail portion extending out through said opening, a spring for actuating the firing pin, linkage connecting the body portion with said anchor to permit up and down movement of the body relative to the anchor while keeping the body in an upright position, including a link having an abutment adapted to engage the tail portion of the firing pin to move said firing pin to cocked position against the action of said spring, and means for releasably holding the firing pin in cocked position.

14. A gun trap comprising an anchor, a hollow body portion having an opening at its lower end, a cartridge holder at the upper end of said body portion, a firing pin reciprocable in said body portion and having a tail portion extending out through said opening, a spring for actuating the firing pin, said firing pin having a shoulder adapted to engage an edge of said opening to releasably hold the firing pin in cocked position, and linkage connecting the body portion with said anchor to permit up and down movement of said body while keeping it upright, including a link adapted to engage the tail portion of the firing pin to move the firing pin longitudinally to cocked position against the action of said spring and thereupon move it laterally to engage said shoulder with said edge to retain the firing pin in cocked position.

15. A gun trap comprising an anchor, a hollow body portion having an opening at its lower end, a cartridge holder at the upper end of said body portion, a firing pin reciprocable in said body portion and having a tail portion extending out through said opening, a spring for actuating said firing pin, means for releasably holding the firing pin in cocked position, and linkage connecting the body portion with said anchor to permit upward and downward movement of the body while maintaining it upright, including a link adapted to engage the tail portion of the firing pin to move the firing pin to cocked position upon downward movement of the body portion and to release the firing pin upon upward movement of said body portion.

16. A trap gun comprising an anchor stake, a body portion having a cartridge holder, vertically spaced parallel links pivotally connected at vertically spaced points to said anchor stake and to said body portion to permit translatory up and down movement of the body portion relative to said anchor stake while maintaining the body portion in upright position, a firing pin reciprocable in said body portion, a spring for actuating said firing pin, means for releasably holding said firing pin in cocked position against the action of said spring, and means actuated by said linkage to release said firing pin solely upon upward movement of said body portion relative to said anchor stake.

17. A trap gun comprising an anchor, a body portion having a cartridge holder, linkage connecting said body portion to said anchor to permit up and down movement of the body portion relative to said anchor while maintaining the body portion in upright position, a firing pin carried by said body portion, a spring for actuating said firing pin, a detent for releasably holding the firing pin in cocked position, means actuated by upward movement of the body portion relative to said anchor to release the firing pin, and releasable safety means for limiting the upward movement of said linkage to prevent accidental upward movement of said body portion sufficient to release the firing pin.

18. A gun trap comprising an anchor, a hollow body portion having an opening at its lower end, connections between the body portion and said anchor permitting up and down movement of the body portion while maintaining it in upright position, a cartridge holder at the upper end of said body portion, a firing pin reciprocable in said body portion and having a tail portion extending out through said opening, a spring for actuating said firing pin, means for releasably holding said firing pin in cocked position against the action of said spring, means actuated by upward movement of said body portion to release the firing pin to fire a cartridge held by said cartridge holder, and visible safety means engaging the projecting tail portion of the firing pin to hold the firing pin against accidental discharge of said cartridge.

19. A gun trap comprising an anchor, a hollow body portion having an opening at its lower end, a cartridge holder at the upper end of said portion, connections between the body portion and said anchor permitting up and down movement of the body portion while maintaining it in upright position, a firing pin reciprocable in said body portion and having a tail portion extending out through said opening, said tail portion having a hole therethrough, a spring for actuating said pin, means for releasably holding said firing pin in cocked position against the action of said spring, means actuated by upward movement of said body portion to release the firing pin to fire a cartridge held by said cartridge holder, and a removable pin extending through said hole in the tail portion of the firing pin to prevent the firing pin discharging said cartridge when said pin is in place.

HAROLD EDWIN COOTES.
HERSHEY ROY GRAYBILL.

REFERENCES CITED

The following references are of record in the file of this patent:

UNITED STATES PATENTS

| Number | Name | Date |
|---|---|---|
| 325,419 | Langdon | Sept. 1, 1885 |
| 343,560 | Baker | June 15, 1886 |
| 790,207 | Holtz | May 16, 1905 |
| 2,059,127 | Marlman | Oct. 27, 1936 |
| 2,301,764 | Wainwright | Nov. 10, 1942 |